US010499305B2

(12) United States Patent
Bai

(10) Patent No.: US 10,499,305 B2
(45) Date of Patent: Dec. 3, 2019

(54) METHOD FOR TRANSMITTING DATA IN WIRELESS LOCAL AREA NETWORK MESH NETWORK, APPARATUS, AND SYSTEM

(71) Applicant: HUAWEI TECHNOLOGIES CO., LTD., Shenzhen, Guangdong (CN)

(72) Inventor: Xiaofei Bai, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 8 days.

(21) Appl. No.: 15/869,418

(22) Filed: Jan. 12, 2018

(65) Prior Publication Data

US 2018/0139676 A1 May 17, 2018

Related U.S. Application Data

(63) Continuation of application No. PCT/CN2015/085451, filed on Jul. 29, 2015.

(51) Int. Cl.

*H04W 40/02* (2009.01)
*H04L 29/12* (2006.01)

(Continued)

(52) U.S. Cl.

CPC ............. *H04W 40/02* (2013.01); *H04L 45/16* (2013.01); *H04L 45/18* (2013.01); *H04L 47/15* (2013.01);

(Continued)

(58) Field of Classification Search

CPC ... H04W 40/02; H04W 28/021; H04W 28/06; H04W 84/12; H04W 84/18; H04W 40/24;

(Continued)

(56) References Cited

U.S. PATENT DOCUMENTS

2006/0268749 A1 11/2006 Rahman et al.
2006/0268823 A1* 11/2006 Kim .................... H04W 72/005 370/349

(Continued)

FOREIGN PATENT DOCUMENTS

| | | | |
|---|---|---|---|
| CN | 1859257 | A | 11/2006 |
| CN | 101616426 | A | 12/2009 |
| CN | 103974363 | A | 8/2014 |

OTHER PUBLICATIONS

Extended European Search Report issued in European Application No. 15899256.0 dated May 24, 2018, 6 pages.

(Continued)

*Primary Examiner* — Paul H Masur
*Assistant Examiner* — Michael K Phillips
(74) *Attorney, Agent, or Firm* — Fish & Richardson P.C.

(57) ABSTRACT

Example methods, apparatuses, and systems for transmitting data in a wireless local area network mesh network are described herein. One example method includes receiving, by a first mesh station, a first data frame sent by a second mesh station, where a transmitter address of the first data frame is a MAC address of the second mesh station, and wherein the first and second mesh stations belong to different mesh gates. The first mesh station determines that the first data frame is one of a broadcast data frame, a multicast data frame, or an unknown unicast data frame and, further, that the first mesh station and the second mesh station belong to different mesh gates. In response to these determinations, the first data frame is discarded. The examples methods can be applied to a wireless mesh network including multiple mesh gates.

18 Claims, 9 Drawing Sheets

A first mesh station receives a first data frame sent by a second mesh station, where a transmitter address of the first data frame is a MAC address of the second mesh station, the first mesh station belongs to a first mesh gate, and the second mesh station belongs to a second mesh gate

S101

The first mesh station determines that the first data frame is a broadcast data frame, a multicast data frame, or an unknown unicast data frame; determines, according to the MAC address of the second mesh station, that the first mesh station and the second mesh station belong to different mesh gates; and discards the first data frame

S102

(51) Int. Cl.

| | |
|---|---|
| ***H04W 28/02*** | (2009.01) |
| ***H04L 12/761*** | (2013.01) |
| ***H04L 12/705*** | (2013.01) |
| ***H04L 12/801*** | (2013.01) |
| ***H04L 12/823*** | (2013.01) |
| *H04L 12/18* | (2006.01) |
| *H04W 28/06* | (2009.01) |
| *H04W 84/12* | (2009.01) |
| *H04W 84/18* | (2009.01) |

(52) U.S. Cl.
CPC .......... *H04L 47/32* (2013.01); *H04L 61/6022* (2013.01); *H04W 28/021* (2013.01); *H04L 12/189* (2013.01); *H04W 28/06* (2013.01); *H04W 84/12* (2013.01); *H04W 84/18* (2013.01)

(58) Field of Classification Search
CPC .... H04W 4/06; H04W 40/32; H04L 61/6022; H04L 45/16; H04L 45/18; H04L 47/15; H04L 47/32; H04L 12/189; H04L 45/48; H04L 45/04; H04L 45/66
See application file for complete search history.

(56) References Cited

U.S. PATENT DOCUMENTS

| | | | | |
|---|---|---|---|---|
| 2007/0081482 A1* | 4/2007 | Roh | H04H 20/42 | 370/312 |
| 2009/0122707 A1 | 5/2009 | Weinman | | |
| 2013/0100872 A1* | 4/2013 | Zou | H04W 40/02 | 370/312 |
| 2014/0089912 A1* | 3/2014 | Wang | G06F 8/65 | 717/173 |
| 2014/0226644 A1* | 8/2014 | Raman | H04L 12/66 | 370/338 |

OTHER PUBLICATIONS

IEEE 802.11-2012 IEEE Standard for Information technology; Telecommunications and information exchange between systems; Local and metropolitan area networks; Specific requirements; Part 11: Wireless LAN Medium Access Control (MAC)and Physical Layer(PHY) Specifications, IEEE Computer Society,dated Mar. 29, 2012,total 2793 pages.

Qingqing Lin, "The Study of Routing Protocol in Wireless Mesh Network", Nanjing University of Posts and Telecommunications,dated 2013,total 63 pages.

Qiu Xiao-lan et al., "Multiple Gateway Anycast QoS Routing Model in Wireless Mesh Networks", Microelectronics and Computer,dated Aug. 2010,total 4 pages.

D Kaushal et al., "Hierarchical Cluster Based Routing for Wireless Mesh Networks Using Group Head", 2012 International Conference on Computing Sciences,dated Sep. 15, 2012,total 5 pages.

IEEE Std 802.1 Q-2014,IEEE Standard for Local and metropolitan area networks—Bridges and Bridged Networks, IEEE Computer Society,dated Nov. 3, 2014,total 1832 pages.

International Search Report and Written Opinion in International Application No. PCT/CN2015/085451, dated Apr. 28, 2016, 18 pages.

Office Action issued in Chinese Application No. 201580037155.5 dated May 7, 2019, 12 pages (with English translation).

* cited by examiner

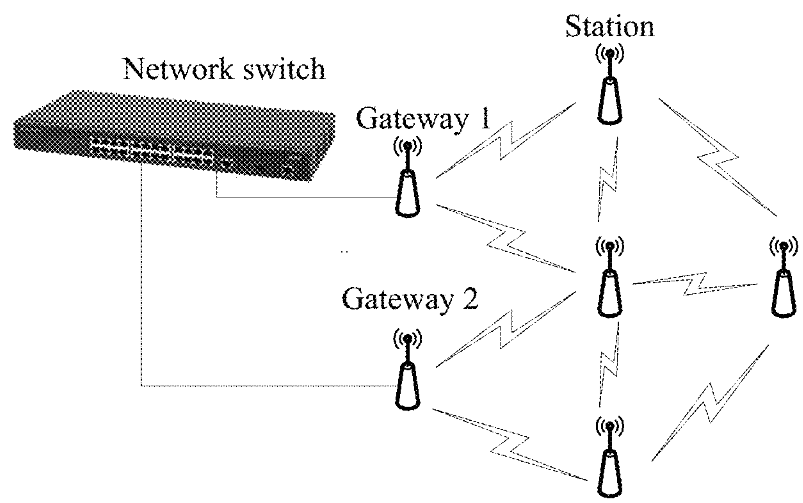
FIG. 1 (--PRIOR ART--)
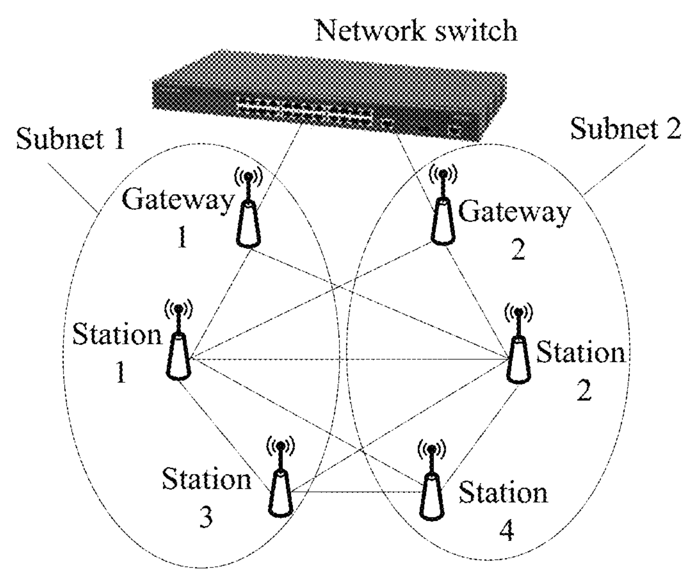
FIG. 2

METHOD FOR TRANSMITTING DATA IN WIRELESS LOCAL AREA NETWORK MESH NETWORK, APPARATUS, AND SYSTEM

CROSS-REFERENCE TO RELATED APPLICATIONS

This application is a continuation of International Application No. PCT/CN2015/085451, filed on Jul. 29, 2015, the disclosure of which is hereby incorporated by reference in its entirety.

TECHNICAL FIELD

This application relates to the communications field, and in particular, to a method for transmitting data in a wireless local area network (WLAN) mesh network, an apparatus, and a system.

BACKGROUND

A network may include a WLAN mesh network (hereinafter referred to as a wireless mesh network) and an external network. If the wireless mesh network is connected to the external network by using multiple mesh gates, a loop may occur in the network including the wireless mesh network and the external network. The mesh gate refers to a device that has a function of a mesh station and that provides a mesh basic service set (MBSS) with access, for which a wireless medium (WM) is used, to one or more distribution systems. The external network is a distribution system connected to the mesh gate. The external network may be a wired network or a combination of a wired network and a wireless network.

For example, in a network shown in FIG. 1, a wireless mesh network includes a gateway 1, a gateway 2, and multiple mesh stations. Both the gateway 1 and the gateway 2 are mesh gates. An external network connected to the wireless mesh network includes a network switch. The network switch is connected to the gateway 1 and the gateway 2. A broadcast data frame, a multicast data frame, or an unknown unicast data frame sent by the gateway 1 may arrive at the gateway 2 by using the mesh station in the wireless mesh network. Because both the gateway 1 and the gateway 2 are connected to the network switch, the data frame may arrive at the gateway 1 by using the network switch. Consequently, the data frame loops constantly in the wireless mesh network, piles up, and ultimately causes a network storm, that is, causes a loop in the network shown in FIG. 1.

The Institute of Electrical and Electronics Engineers (IEEE) 802.11-2012 protocol specifies that a switching device, for example, a network switch, in an external network uses the Rapid Spanning Tree Protocol (RSTP) to resolve a problem of a loop between a wireless mesh network and the external network. Specifically, RSTP blocks some ports in the network, so that the wireless mesh network and the external network can be connected by using only one mesh gate, thereby resolving the loop problem.

If the loop problem is resolved by using the foregoing method, the wireless mesh network and the external network can be connected by using only one mesh gate. If the wireless mesh network is large in scale, a single mesh gate cannot process data between the large-scale wireless mesh network and the external network in a timely manner. Consequently, congestion occurs at the mesh gate.

SUMMARY

Embodiments of the present invention provide a method for transmitting data in a WLAN mesh network, an apparatus, and a system, so as to prevent congestion at a mesh gate while avoiding a loop.

To achieve the foregoing objective, the embodiments of the present invention use the following technical solutions:

According to a first aspect, an embodiment of the present invention provides a method for transmitting data in a WLAN mesh network, where the method includes:

receiving, by a first mesh station, a first data frame sent by a second mesh station, where a transmitter address of the first data frame is a media access control (MAC) address of the second mesh station, the first mesh station belongs to a first mesh gate, and the second mesh station belongs to a second mesh gate; and determining, by the first mesh station, that the first data frame is a broadcast data frame, a multicast data frame, or an unknown unicast data frame; determining, according to the MAC address of the second mesh station, that the first mesh station and the second mesh station belong to different mesh gates; and discarding the first data frame.

With reference to the first aspect, in a first possible implementation manner of the first aspect, before the receiving, by a first mesh station, a first data frame sent by a second mesh station, the method further includes:

receiving, by the first mesh station, a management frame sent by the second mesh station, where a transmitter address of the management frame is the MAC address of the second mesh station, and the management frame includes an identifier of the second mesh gate; and obtaining, by the first mesh station, a correspondence between the second mesh station and the second mesh gate; and the determining, by the first mesh station according to the MAC address of the second mesh station, that the first mesh station and the second mesh station belong to different mesh gates includes:

determining, by the first mesh station according to the MAC address of the second mesh station and the correspondence between the second mesh station and the second mesh gate, that the first mesh station and the second mesh station belong to different mesh gates.

With reference to the first aspect or the first possible implementation manner of the first aspect, in a second possible implementation manner of the first aspect, before the receiving, by a first mesh station, a first data frame sent by a second mesh station, the method further includes:

- determining, by the first mesh station, a minimum overhead between the first mesh station and each of multiple mesh gates, where the multiple mesh gates include the first mesh gate and the second mesh gate; and
- selecting, by the first mesh station, the first mesh gate as a mesh gate to which the first mesh station belongs, where among the multiple mesh gates an overhead between the first mesh gate and the first mesh station is the minimum overhead.

With reference to any one of the first aspect, or the first or the second possible implementation manner of the first aspect, in a third possible implementation manner of the first aspect, the method further includes:

receiving, by the first mesh station, a second data frame sent by a third mesh station, where a transmitter address of the second data frame is a MAC address of the third mesh station, and the third mesh station belongs to the first mesh gate; and determining, by the first mesh station, that the second data frame is a broadcast data frame, a multicast data frame, or an unknown unicast data frame; determining, according to the MAC address of the third mesh station, that the first mesh station and the third mesh station belong to a same mesh gate; and processing the second data frame.

With reference to any one of the first aspect, or the first to the third possible implementation manners of the first aspect, in a fourth possible implementation manner of the first aspect, the method further includes:

receiving, by the first mesh station, a third data frame sent by the second mesh station, where a transmitter address of the third data frame is the MAC address of the second mesh station; and determining, by the first mesh station, that the third data frame is a known unicast data frame; and forwarding the third data frame.

With reference to any one of the first aspect, or the first to the fourth possible implementation manners of the first aspect, in a fifth possible implementation manner of the first aspect, the method further includes:

determining, by the first mesh station, that a receiver address of a to-be-sent fourth data frame is the MAC address of the second mesh station; determining that the fourth data frame is a broadcast data frame or a multicast data frame; and skipping sending the fourth data frame.

According to a second aspect, an embodiment of the present invention provides a station, where the station is a mesh station supporting a mesh function, the mesh station is a first mesh station, and the first mesh station includes:

a receiving unit, configured to receive a first data frame sent by a second mesh station, where a transmitter address of the first data frame is a MAC address of the second mesh station, the first mesh station belongs to a first mesh gate, and the second mesh station belongs to a second mesh gate;

a determining unit, configured to: determine that the first data frame received by the receiving unit is a broadcast data frame, a multicast data frame, or an unknown unicast data frame; and determine, according to the MAC address of the second mesh station that is received by the receiving unit, that the first mesh station and the second mesh station belong to different mesh gates; and a processing unit, configured to discard, according to the result determined by the determining unit, the first data frame received by the receiving unit.

With reference to the second aspect, in a first possible implementation manner of the second aspect, the first mesh station further includes an obtaining unit, where the receiving unit is further configured to: before receiving the first data frame sent by the second mesh station, receive a management frame sent by the second mesh station, where a transmitter address of the management frame is the MAC address of the second mesh station, and the management frame includes an identifier of the second mesh gate;

the obtaining unit is configured to obtain a correspondence between the second mesh station and the second mesh gate; and the determining unit is specifically configured to determine, according to the MAC address of the second mesh station that is received by the receiving unit and the correspondence between the second mesh station and the second mesh gate that is obtained by the obtaining unit, that the first mesh station and the second mesh station belong to different mesh gates.

With reference to the second aspect or the first possible implementation manner of the second aspect, in a second possible implementation manner of the second aspect, the first mesh station further includes a selection unit, where the determining unit is further configured to: before the receiving unit receives the first data frame sent by the second mesh station, determine a minimum overhead between the first mesh station and each of multiple mesh gates, where the multiple mesh gates include the first mesh gate and the second mesh gate; and the selection unit is configured to select, according to the minimum overhead that is between the first mesh station and each of the multiple mesh gates and that is determined by the determining unit, the first mesh gate as a mesh gate to which the first mesh station belongs, where among the multiple mesh gates an overhead between the first mesh gate and the first mesh station is the minimum overhead.

With reference to any one of the second aspect, or the first or the second possible implementation manner of the second aspect, in a third possible implementation manner of the second aspect, the receiving unit is further configured to receive a second data frame sent by a third mesh station, where a transmitter address of the second data frame is a MAC address of the third mesh station, and the third mesh station belongs to the first mesh gate;

the determining unit is further configured to: determine that the second data frame received by the receiving unit is a broadcast data frame, a multicast data frame, or an unknown unicast data frame; and determine, according to the MAC address of the third mesh station that is received by the receiving unit, that the first mesh station and the third mesh station belong to a same mesh gate; and the processing unit is further configured to process, according to the result determined by the determining unit, the second data frame received by the receiving unit.

With reference to any one of the second aspect, or the first to the third possible implementation manners of the second aspect, in a fourth possible implementation manner of the second aspect, the receiving unit is further configured to receive a third data frame sent by the second mesh station, where a transmitter address of the third data frame is the MAC address of the second mesh station;

the determining unit is further configured to determine that the third data frame received by the receiving unit is a known unicast data frame; and the processing unit is further configured to forward the third data frame according to the result determined by the determining unit.

With reference to any one of the second aspect, or the first to the fourth possible implementation manners of the second aspect, in a fifth possible implementation manner of the second aspect, the determining unit is further configured to: determine that a receiver address of a to-be-sent fourth data frame is the MAC address of the second mesh station, and determine that the fourth data frame is a broadcast data frame or a multicast data frame; and the processing unit is further configured to skip sending the fourth data frame according to the result determined by the determining unit.

According to a third aspect, an embodiment of the present invention provides a station, where the station is a mesh station supporting a mesh function, the mesh station is a first mesh station, and the first mesh station includes:

a transceiver, configured to receive a first data frame sent by a second mesh station, where a transmitter address of the first data frame is a media access control (MAC) address of the second mesh station, the first mesh station belongs to a first mesh gate, and the second mesh station belongs to a second mesh gate; and a processor, configured to: determine that the first data frame received by the transceiver is a broadcast data frame, a multicast data frame, or an unknown unicast data frame; determine, according to the MAC address of the second mesh station that is received by the transceiver, that the first mesh station and the second mesh station belong to different mesh gates; and discard the first data frame received by the transceiver.

With reference to the third aspect, in a first possible implementation manner of the third aspect, the transceiver is further configured to: before receiving the first data frame sent by the second mesh station, receive a management frame sent by the second mesh station, where a transmitter address of the management frame is the MAC address of the second mesh station, and the management frame includes an identifier of the second mesh gate; and the processor is further configured to: obtain a correspondence between the second mesh station and the second mesh gate; and determine, according to the MAC address of the second mesh station that is received by the transceiver and the correspondence between the second mesh station and the second mesh gate, that the first mesh station and the second mesh station belong to different mesh gates.

With reference to the third aspect or the first possible implementation manner of the third aspect, in a second possible implementation manner of the third aspect, the processor is further configured to: before the transceiver receives the first data frame sent by the second mesh station, determine a minimum overhead between the first mesh station and each of multiple mesh gates; and select, according to the minimum overhead between the first mesh station and each of the multiple mesh gates, the first mesh gate as a mesh gate to which the first mesh station belongs, where the multiple mesh gates include the first mesh gate and the second mesh gate, and among the multiple mesh gates an overhead between the first mesh gate and the first mesh station is the minimum overhead.

With reference to any one of the third aspect, or the first or the second possible implementation manner of the third aspect, in a third possible implementation manner of the third aspect, the transceiver is further configured to receive a second data frame sent by a third mesh station, where a transmitter address of the second data frame is a MAC address of the third mesh station, and the third mesh station belongs to the first mesh gate; and the processor is further configured to: determine that the second data frame received by the transceiver is a broadcast data frame, a multicast data frame, or an unknown unicast data frame; determine, according to the MAC address of the third mesh station that is received by the transceiver, that the first mesh station and the third mesh station belong to a same mesh gate; and process the second data frame received by the transceiver.

With reference to any one of the third aspect, or the first to the third possible implementation manners of the third aspect, in a fourth possible implementation manner of the third aspect, the transceiver is further configured to receive a third data frame sent by the second mesh station, where a transmitter address of the third data frame is the MAC address of the second mesh station; and the processor is further configured to: determine that the third data frame received by the transceiver is a known unicast data frame, and forward the third data frame received by the transceiver.

With reference to any one of the third aspect, or the first to the fourth possible implementation manners of the third aspect, in a fifth possible implementation manner of the third aspect, the processor is further configured to: determine that a receiver address of a to-be-sent fourth data frame is the MAC address of the second mesh station, determine that the fourth data frame is a broadcast data frame or a multicast data frame, and skip sending the fourth data frame.

According to a fourth aspect, an embodiment of the present invention provides a WLAN mesh network system, where the system includes:

a first mesh station, a second mesh station, and multiple mesh gates, where the first mesh station is the first mesh station according to any one of the third aspect or the possible implementation manners of the third aspect.

Based on the foregoing technical solutions, on the one hand, when a first data frame that is received by a first mesh station and sent by a second mesh station that belongs to a mesh gate different from that to which the first mesh station belongs is a broadcast data frame, a multicast data frame, or an unknown unicast data frame, the first mesh station discards the first data frame, that is, the first mesh station does not process the first data frame, so that the first data frame is not propagated between different mesh gates. Therefore, a loop in a network including a wireless mesh network and an external network can be avoided. On the other hand, in the embodiments of the present invention, because there is still a first mesh gate and a second mesh gate, and a quantity of mesh gates in the wireless mesh network is not reduced, congestion at the mesh gate can be prevented. Therefore, in the embodiments of the present invention, congestion at the mesh gate can be prevented while a loop is avoided.

BRIEF DESCRIPTION OF DRAWINGS

To describe the technical solutions in the embodiments of the present invention or conventional technical solutions more clearly, the following briefly describes the accompanying drawings required for describing the embodiments of the present invention or the conventional technical solutions. Apparently, the accompanying drawings in the following description show merely some embodiments of the present invention, and a person of ordinary skill in the art may still derive other drawings from these accompanying drawings without creative efforts.

FIG. 1 is a schematic architectural diagram of a conventional wireless mesh network;

FIG. 2 is a schematic architectural diagram of a wireless mesh network according to an embodiment of the present invention;

DESCRIPTION OF EMBODIMENTS

Figure 3:
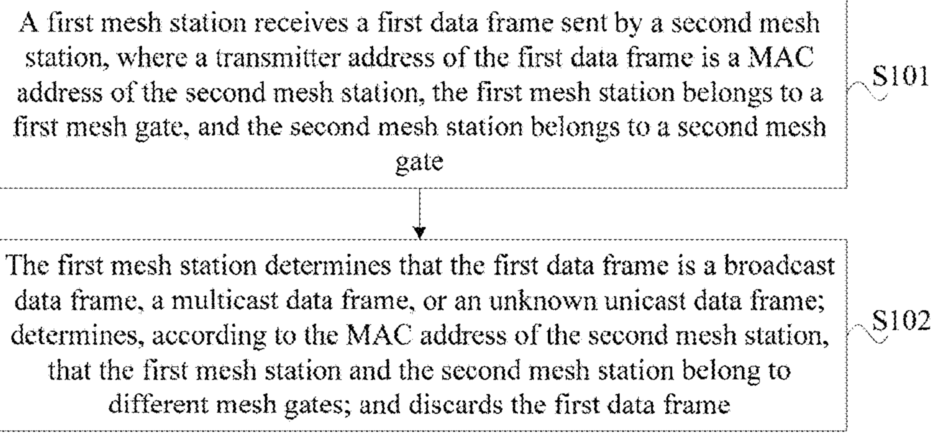
FIG. 3 is a flowchart 1 of a method for transmitting data in a wireless mesh network according to an embodiment of the present invention.

The following clearly describes the technical solutions in the embodiments of the present invention with reference to the accompanying drawings in the embodiments of the present invention.

Generally, "/" mentioned in the embodiments of the present invention indicates an "or" relationship between associated objects. For example, "A/B" may be construed as "A" or For ease of description, a WLAN mesh network provided in the embodiments of the present invention is referred to as a wireless mesh network in the following. That is, a method for transmitting data in a WLAN mesh network, an apparatus, and a system that are provided in the embodiments of the present invention may be a method for transmitting data in a wireless mesh network, an apparatus, and a system.

The method for transmitting data in a wireless mesh network, the apparatus, and the system that are provided in the embodiments of the present invention can be applied to a wireless mesh network including multiple mesh gates. For example, as shown in FIG. 2, FIG. 2 is an architectural diagram of a possible application scenario of the method for transmitting data in a wireless mesh network, the apparatus, and the system that are provided in the embodiments of the present invention. The architectural diagram is an architectural diagram of a wireless mesh network system.

In FIG. 2, a wireless mesh network includes two mesh gates and multiple mesh stations. The two mesh gates are a gateway 1 and a gateway 2 respectively. The multiple mesh stations are a station 1, a station 2, a station 3, and a station 4 respectively. An external network connected to the wireless mesh network includes a network switch. The network switch is connected to the gateway 1 and the gateway 2. The gateway 1 establishes a mesh link with the station 1 and the station 2. The gateway 2 establishes a mesh link with the station 1 and the station 2. A mesh link is established between any two of the station 1, the station 2, the station 3, or the station 4. The station 1 and the station 3 belong to the gateway 1, and the station 2 and the station 4 belong to the gateway 2. The mesh link refers to a link between a mesh station and a neighboring mesh station that have a mesh peering with each other.

In the following embodiments, a subnet involved in descriptions of the method for transmitting data in a wireless mesh network, the apparatus, and the system is logical division of a wireless mesh network. It may be considered that mesh stations that belong to a same mesh gate belong to a same subnet. Specifically, division/formation of a subnet of a wireless mesh network is described in detail in the following embodiments.

Embodiment 1

As shown in FIG. 3, this embodiment of the present invention provides a method for transmitting data in a wireless mesh network. The method may include the following steps.

S101. A first mesh station receives a first data frame sent by a second mesh station, where a transmitter address of the first data frame is a MAC address of the second mesh station, the first mesh station belongs to a first mesh gate, and the second mesh station belongs to a second mesh gate.

In this embodiment of the present invention, the first mesh station and the second mesh station are two mesh stations in a wireless mesh network. The first mesh station and the second mesh station are neighboring stations that have a mesh peering with each other. The first mesh station may be an access point (AP). The second mesh station may also be an AP. The mesh peering refers to a relationship between two mesh stations that is required for direct communication over a single instance of the wireless medium. A mesh peering is established with a mesh peering protocol.

In the method for transmitting data in a wireless mesh network provided in this embodiment of the present invention, methods executed by all mesh stations in a wireless mesh network are the same. Therefore, in this embodiment of the present invention, only one mesh station, that is, the first mesh station, in the wireless mesh network is used as an example for description.

A frame header of the first data frame in this embodiment of the present invention includes a destination address of the first data frame.

In this embodiment of the present invention, a data frame may not need to be propagated in the entire wireless mesh network. However, when the data frame is a broadcast data frame, a multicast data frame, or an unknown unicast data frame, the data frame may be propagated in the entire wireless mesh network. Consequently, a loop is formed in a network including the wireless mesh network and an external network. A broadcast data frame means that a destination address of the data frame is a broadcast address. A multicast data frame means that a destination address of the data frame is a multicast address. An unknown unicast data frame means that a destination address of the data frame is a unicast address, and the unicast address does not exist in a MAC forwarding table of the first mesh station. For an unknown unicast data frame, because the first mesh station cannot obtain a path for forwarding the data frame, the first mesh station generally broadcasts the data frame.

A destination address is stored in different fields of a data frame in different cases. For example, the destination address may be in an address 1, an address 3, or an address 5 of a MAC header of a WLAN frame; may be in a frame header of an aggregate MAC service data unit (A-MSDU) subframe of a WLAN frame; or may be in a MAC header of an Ethernet frame. The Ethernet frame is encapsulated in a frame body of a WLAN frame.

In this embodiment of the present invention, the transmitter address (TA) of the first data frame is the MAC address of the second mesh station. The transmitter address may be an address 2 of a MAC header of a WLAN frame.

The first mesh station belongs to the first mesh gate, and the second mesh station belongs to the second mesh gate. For example, as shown in FIG. 2, assuming that the first mesh station is a station 3, the second mesh station may be a station 2 or a station 4. The station 3 and a station 1 belong to a gateway 1, and the station 2 and the station 4 belong to a gateway 2. The station 3, the station 1, and the gateway 1 may be considered as a subnet, such as a subnet 1. The station 2, the station 4, and the gateway 2 may be considered as a subnet, such as a subnet 2. The subnet mentioned in this embodiment of the present invention is different from an IP subnet in the Internet Protocol (IP). In addition, the subnet mentioned in this embodiment of the present invention is also different from a virtual local area network (VLAN) in Ethernet. The subnet mentioned in this embodiment of the present invention is a set of mesh stations that belong to a same mesh gate. The subnet is only used to separate a broadcast data frame, a multicast data frame, or an unknown unicast data frame. The subnet does not separate a known unicast data frame.

S102. The first mesh station determines that the first data frame is a broadcast data frame, a multicast data frame, or an unknown unicast data frame; determines, according to the MAC address of the second mesh station, that the first mesh station and the second mesh station belong to different mesh gates; and discards the first data frame.

The first data frame includes the destination address of the first data frame. Specifically, after receiving the first data frame sent by the second mesh station, the first mesh station may determine, according to the destination address of the first data frame, that the first data frame is a broadcast data frame, a multicast data frame, or an unknown unicast data frame.

The first mesh station may determine, according to the MAC address of the second mesh station, that the first mesh station and the second mesh station belong to different mesh gates. Specifically, a method for determining, by the first mesh station according to the MAC address of the second mesh station, that the first mesh station and the second mesh station belong to different mesh gates is described in detail in the following embodiment, and is not described herein again.

In this embodiment of the present invention, when determining that the first data frame that is sent by the second mesh station and received by the first mesh station is a broadcast data frame, a multicast data frame, or an unknown unicast data frame, and that the first mesh station and the second mesh station belong to different mesh gates, the first mesh station discards the first data frame, that is, the first mesh station does not process the first data frame.

In the method provided in this embodiment of the present invention, a broadcast data frame, a multicast data frame, or an unknown unicast data frame is not propagated between mesh stations that belong to different mesh gates. That is, the broadcast data frame, the multicast data frame, or the unknown unicast data frame is not propagated between different subnets, but is propagated only in a same subnet. Therefore, a loop in a network including a wireless mesh network and an external network can be avoided.

Based on the foregoing technical solution, on the one hand, when a first data frame that is received by a first mesh station and sent by a second mesh station that belongs to a mesh gate different from that to which the first mesh station belongs is a broadcast data frame, a multicast data frame, or an unknown unicast data frame, the first mesh station discards the first data frame, that is, the first mesh station does not process the first data frame, so that the first data frame is not propagated between different mesh gates. Therefore, a loop in a network including a wireless mesh network and an external network can be avoided. On the other hand, in this embodiment of the present invention, because there is still a first mesh gate and a second mesh gate, and a quantity of mesh gates in the wireless mesh network is not reduced, congestion at the mesh gate can be prevented. Therefore, in this embodiment of the present invention, congestion at the mesh gate can be prevented while a loop is avoided. In addition, after passing through the external network connected to the wireless mesh network, a broadcast data frame, a multicast data frame, and an unknown unicast data frame that are in a subnet in which a gateway 1 in the wireless mesh network is located eventually return to a subnet in which a gateway 2 is located. Therefore, it is ensured that the broadcast data frame, the multicast data frame, and the unknown unicast data frame are propagated in the entire wireless mesh network without causing a loop.

Figure 4:
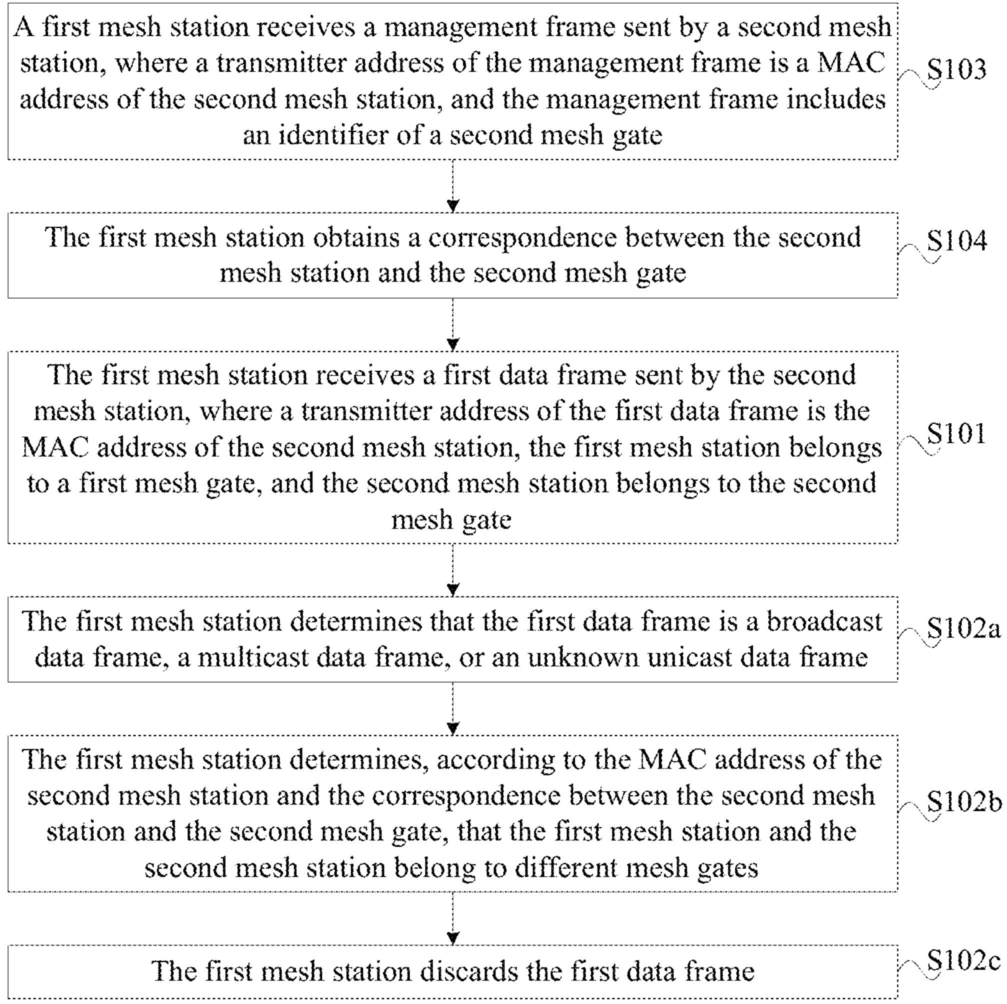
FIG. 4 is a flowchart 2 of a method for transmitting data in a wireless mesh network according to an embodiment of the present invention.

Optionally, with reference to FIG. 3, as shown in FIG. 4, before S101, the method for transmitting data in a wireless mesh network provided in this embodiment of the present invention may further include the following steps.

S103. The first mesh station receives a management frame sent by the second mesh station, where a transmitter address of the management frame is the MAC address of the second mesh station, and the management frame includes an identifier of the second mesh gate.

The management frame may be a beacon frame. The second mesh station periodically sends the beacon frame. The beacon frame includes an identifier of a mesh gate (for example, the second mesh gate) to which the second mesh station belongs. Because the beacon frame is periodically sent by the second mesh station, when the mesh gate to which the second mesh station belongs changes, each neighboring station of the second mesh station may update the mesh gate to which the second mesh station belongs.

Optionally, the management frame may be a probe response frame. The probe response frame includes an identifier of a mesh gate (for example, the second mesh gate) to which the second mesh station belongs. After receiving a probe request frame, the second mesh station sends a probe response frame in response to the probe request frame. The probe response frame may include the identifier of the mesh gate to which the second mesh station belongs. Because a beacon frame is periodically sent, there is a specific time interval between two times of sending. If a probe response frame includes an identifier of a mesh gate to which a transmitter (for example, the second mesh station) of the probe response frame belongs, a receiver (for example, the first mesh station) of the probe response frame may not need to learn, only when the transmitter sends the beacon frame next time, the mesh gate to which the transmitter belongs. That is, the receiver of the probe response frame can learn, in a timely manner, the mesh gate to which the transmitter of the probe response frame belongs. In this way, a waiting time of a neighboring station of the second mesh station can be reduced.

The identifier of the second mesh gate may be a MAC address of the second mesh gate.

In this embodiment of the present invention, an extension field may be added to the management frame to store an identifier of a mesh gate to which a mesh station belongs. Specifically, the extension field may be added to a frame header of the management frame to store the identifier of the mesh gate to which the mesh station belongs. For example, the second mesh station may add the extension field to the frame header of the management frame sent by the second mesh station, to store the identifier of the mesh gate to which the second mesh station belongs, that is, the identifier of the second mesh gate.

S104. The first mesh station obtains a correspondence between the second mesh station and the second mesh gate.

In this embodiment of the present invention, a method for obtaining, by the first mesh station, the correspondence between the second mesh station and the second mesh gate may be one of the following.

(1) The method for obtaining, by the first mesh station, the correspondence may be: recording, by the first mesh station, a mapping from the second mesh station to the second mesh gate.

For example, the mapping from the second mesh station to the second mesh gate may be a mapping from the MAC address of the second mesh station to the MAC address of the second mesh gate.

(2) The method for obtaining, by the first mesh station, the correspondence may be: adding, by the first mesh station, the second mesh station to a first set as an element of the first set. The first set includes all mesh stations that belong to a mesh gate different from that to which the first mesh station belongs and that are known to the first mesh station.

For example, the first set includes MAC addresses of all the mesh stations that belong to the mesh gate different from that to which the first mesh station belongs and that are known to the first mesh station. Elements of the first set are the MAC addresses of all the mesh stations that belong to the mesh gate different from that to which the first mesh station belongs and that are known to the first mesh station.

The adding, by the first mesh station, the second mesh station to a first set as an element of the first set may be: adding, by the first mesh station, the MAC address of the second mesh station to the first set as an element of the first set.

(3) The method for obtaining, by the first mesh station, the correspondence may be: maintaining, by the first mesh station, a second set. The second set includes all mesh stations that belong to a same mesh gate as the first mesh station and that are known to the first mesh station.

For example, the second set includes MAC addresses of all the mesh stations that belong to the same mesh gate as the first mesh station and that are known to the first mesh station. Elements of the second set are the MAC addresses of all the mesh station that belong to the same mesh gate as the first mesh station and that are known to the first mesh station.

Because the first mesh station and the second mesh station belong to different mesh gates, the first mesh station does not add the second mesh station to the second set.

(4) The first mesh station may maintain both a first set and a second set. The first mesh station adds the second mesh station to the first set as an element of the first set, and does not add the second mesh station to the second set.

As shown in FIG. 4, S102 may specifically include the following steps.

S102*a*. The first mesh station determines that the first data frame is a broadcast data frame, a multicast data frame, or an unknown unicast data frame.

S102*b*. The first mesh station determines, according to the MAC address of the second mesh station and the correspondence between the second mesh station and the second mesh gate, that the first mesh station and the second mesh station belong to different mesh gates.

If the method for obtaining, by the first mesh station, the correspondence between the second mesh station and the second mesh gate is (1), the first mesh station may determine, according to the MAC address of the second mesh station and the mapping recorded by the first mesh station, that the second mesh station belongs to the second mesh gate, so as to determine that the first mesh station and the second mesh station belong to different mesh gates.

If the method for obtaining, by the first mesh station, the correspondence between the second mesh station and the second mesh gate is (2), the first mesh station may search the first set for the MAC address of the second mesh station. If the MAC address of the second mesh station exists in the first set, the first mesh station determines that the first mesh station and the second mesh station belong to different mesh gates.

If the method for obtaining, by the first mesh station, the correspondence between the second mesh station and the second mesh gate is (3), the first mesh station may search the second set for the MAC address of the second mesh station. If the MAC address of the second mesh station does not exist in the second set, the first mesh station determines that the first mesh station and the second mesh station belong to different mesh gates.

If the method for obtaining, by the first mesh station, the correspondence between the second mesh station and the second mesh gate is (4), the first mesh station may search the first set and the second set for the MAC address of the second mesh station. If the MAC address of the second mesh station exists in the first set, the first mesh station determines that the first mesh station and the second mesh station belong to different mesh gates.

A method for determining, by the first mesh station, that the first mesh station and the second mesh station belong to different mesh gates may be properly adjusted according to the method for obtaining, by the first mesh station, the correspondence between the second mesh station and the second mesh gate.

S102*c*. The first mesh station discards the first data frame.

When determining that the first data frame is a broadcast data frame, a multicast data frame, or an unknown unicast data frame, and that the first mesh station and the second mesh station belong to different mesh gates, the first mesh station discards the first data frame, that is, the first mesh station does not process the first data frame.

In this embodiment of the present invention, a first mesh station determines that a first data frame received by the first mesh station is a broadcast data frame, a multicast data frame, or an unknown unicast data frame, and that the first mesh station and a second mesh station that sends the first data frame belong to different mesh gates, so that the first data frame can be controlled to be propagated only in a same subnet (including a same gateway), but not between different subnets (including different mesh gates). Therefore, a loop in a network including a wireless mesh network and an external network can be avoided.

Figure 5:
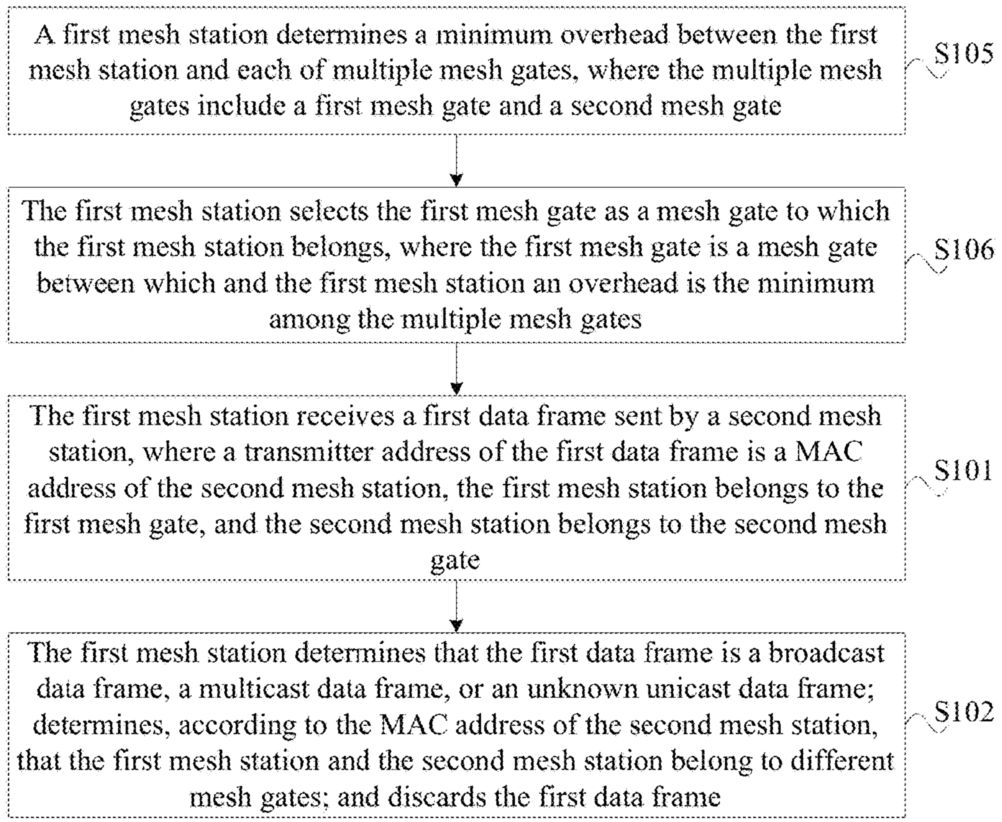
FIG. 5 is a flowchart 3 of a method for transmitting data in a wireless mesh network according to an embodiment of the present invention.

Optionally, with reference to FIG. 3, as shown in FIG. 5, before S101, the method for transmitting data in a wireless mesh network provided in this embodiment of the present invention may further include the following steps.

S105. The first mesh station determines a minimum overhead between the first mesh station and each of multiple mesh gates, where the multiple mesh gates include the first mesh gate and the second mesh gate.

S106. The first mesh station selects the first mesh gate as a mesh gate to which the first mesh station belongs, where among the multiple mesh gates an overhead between the first mesh gate and the first mesh station is the minimum overhead.

In this embodiment of the present invention, each of the multiple mesh gates is a mesh gate in a mesh network in which the first mesh station and the second mesh station are located.

"Multiple" in this embodiment of the present invention refers to two or more. For example, multiple mesh gates refer to two or more mesh gates.

In S105, an implementation manner of determining, by the first mesh station, the minimum overhead between the first mesh station and each of the multiple mesh gates is not specifically limited in this embodiment of the present invention, and may be specifically implemented by manufacturers according to different needs of the manufacturers.

To describe more clearly the determining, by the first mesh station, the minimum overhead between the first mesh station and each of the multiple mesh gates, this embodiment of the present invention uses a possible implementation manner as an example to illustrate a method for determining, by the first mesh station, the minimum overhead between the first mesh station and each of the multiple mesh gates.

In the implementation manner provided in this embodiment of the present invention, one piece of indication information may be included in the management frame mentioned in S103. The indication information may be used to indicate a minimum overhead between the second mesh station that sends the management frame and the second mesh gate to which the second mesh station belongs.

After the first mesh station is powered on, the first mesh station starts to receive multiple management frames sent by multiple neighboring stations (for example, the second mesh station and a third mesh station) of the first mesh station. Each of the multiple management frames includes one piece of indication information. The indication information may be used to indicate a minimum overhead between a neighboring station that sends the management frame and a mesh gate to which the neighboring station belongs. The mesh gate to which the neighboring station belongs is one of the multiple mesh gates.

Optionally, the indication information included in each of the management frames includes at least one of a received signal strength indication (RSSI) or a path. The RSSI may be used to indicate a maximum received signal strength in a shortest path between the neighboring station that sends the management frame and the mesh gate to which the neighboring station belongs. The maximum received signal strength is the largest one of all received signal strengths between any two stations of stations between the neighboring station and the mesh gate to which the neighboring station belongs and between a station and the mesh gate. The path is used to indicate the shortest path between the neighboring station that sends the management frame and the mesh gate to which the neighboring station belongs.

For example, assuming that a neighboring station of the first mesh station is a station B, a mesh gate to which the station B belongs is a gateway K, and a shortest path between the station B and the gateway K passes through three stations: sequentially a station C, a station D, and a station E, the shortest path between the station B and the gateway K is: the station B—the station C—the station D—the station E—the gateway K. If a management frame starts to be sent from the gateway K, all received signal strengths between any two stations of the stations between the neighboring station and the mesh gate to which the neighboring station belongs and between a station and the gateway include: a signal strength (marked as a received signal strength EK) at which the station E receives the management frame sent by the gateway K, a signal strength (marked as a received signal strength DE) at which the station D receives the management frame sent by the station E, a signal strength (marked as a received signal strength CD) at which the station C receives the management frame sent by the station D, and a signal strength (marked as a received signal strength BC) at which the station B receives the management frame sent by the station C. A maximum received signal strength is the largest one of the received signal strength EK, the received signal strength DE, the received signal strength CD, or the received signal strength BC.

In this embodiment of the present invention, after receiving a management frame sent by a neighboring station, each mesh station may compare a signal strength, at which the mesh station receives the management frame, with a received signal strength (which is specifically a maximum received signal strength indicated by a received signal strength indication) included in the management frame, use the larger one as a maximum received signal strength, and add the maximum received signal strength to the management frame of the mesh station for sending.

When the mesh station receives multiple management frames sent by multiple neighboring stations that belong to a same mesh gate, the mesh station may obtain multiple received signal strengths after performing comparison according to the foregoing method. Then, the mesh station may select the largest one from the multiple received signal strengths as a maximum received signal strength, and add the maximum received signal strength to the management frame of the mesh station for sending.

In the method for transmitting data in a wireless mesh network provided in this embodiment of the present invention, after receiving a management frame sent by a neighboring station of each mesh station, the mesh station obtains indication information included in the management frame. Therefore, after receiving management frames sent by multiple neighboring stations of a first mesh station, the first mesh station may obtain multiple pieces of indication information by obtaining indication information included in each management frame.

After obtaining the multiple pieces of indication information, the first mesh station may determine minimum overheads between the first mesh station and the multiple mesh gates according to the multiple pieces of indication information. The minimum overheads between the first mesh station and the multiple mesh gates are minimum overheads between the first mesh station and all of the multiple mesh gates.

It may be understood that although some neighboring stations may belong to a same mesh gate, shortest paths between these neighboring stations and the mesh gate may be different. Therefore, minimum overheads that are between the first mesh station and the mesh gate and that are determined by the first mesh station according to indication information in management frames sent by these neighboring stations may also be different.

For example, as shown in FIG. 2, both the station 2 and the station 4 belong to the gateway 2, that is, the station 2 and the station 4 belong to a same mesh gate. However, a management frame sent by the gateway 2 can arrive at the station 2 directly, but the management frame sent by the gateway 2 needs to pass through the station 2 to arrive at the station 4. Therefore, if the first mesh station is the station 3, a minimum overhead that is between the station 3 and the gateway 2 and that is determined by the station 3 according to indication information in a management frame sent by the station 2 is marked as an overhead 1, and a minimum overhead that is between the station 3 and the gateway 2 and that is determined by the station 3 according to indication information in a management frame sent by the station 4 is marked as an overhead 2, the overhead 1 is less than the overhead 2, and therefore, the station 3 may determine that a minimum overhead between the station 3 and the gateway 2 is the overhead 1.

The foregoing descriptions of the minimum overhead between the station 3 and the gateway 2 are merely illustrative descriptions of an overhead between one mesh station and one mesh gate, and do not set any limitation to the present invention. In actual application, for different mesh gates, such as the gateway 1 and the gateway 2, the station 3 needs to select, from the gateway 1 and the gateway 2, a gateway as a mesh gate of the station 3, where among the different mesh gates an overhead between the mesh gate and the station 3 is the minimum overhead. For example, a minimum overhead between the station 3 and the gateway 1 may be less than a minimum overhead between the station 3 and the gateway 2, and therefore, the station 3 may select the gateway 1 as the mesh gate of the station 3.

A larger value of the maximum received signal strength indicates a smaller overhead between the neighboring station and the mesh gate to which the neighboring station belongs, that is, a smaller overhead between the first mesh station and the mesh gate. On the contrary, a smaller value of the maximum received signal strength indicates a larger overhead between the neighboring station and the gateway to which the neighboring station belongs, that is, a larger overhead between the first mesh station and the mesh gate.

A smaller value of the shortest path indicates a smaller overhead between the neighboring station and the mesh gate, that is, a smaller overhead between the first mesh station and the mesh gate. On the contrary, a larger value of the shortest path indicates a larger overhead between the neighboring station and the mesh gate, that is, a larger overhead between the first mesh station and the mesh gate.

The path may also be understood as a distance. For example, a shortest path between any two stations may also be understood as a shortest distance between the any two stations.

With reference to the received signal strength indication and the path, when maximum received signal strengths that are sent by several neighboring stations and received by the first mesh station are equal, the first mesh station may further determine, from these neighboring stations, a neighboring station that has the shortest one of shortest paths between these neighboring stations and mesh gates to which these neighboring stations belong. Assuming that a mesh gate to which the neighboring station belongs is the first mesh gate, among the multiple mesh gates an overhead between the first mesh gate and the first mesh station is the minimum overhead.

Correspondingly, when determining that shortest paths between several neighboring stations and mesh gates to which the neighboring stations belong are equal, the first mesh station may further determine, from these neighboring stations, a neighboring station that has the largest one of maximum received signal strengths sent by these neighboring stations. Assuming that a mesh gate to which the neighboring station belongs is the first mesh gate, an overhead between the first mesh gate and the first mesh station is the minimum overhead.

In conclusion, with reference to the received signal strength indication and the path, the first mesh station may select, from the multiple mesh gates, the first mesh gate as the mesh gate of the first mesh station, where among the multiple mesh gates an overhead between the first mesh gate and the first mesh station is the minimum overhead.

Optionally, in actual application, if overheads between two or more mesh gates and the first mesh station are the minimum, and the two or more mesh gates are determined by the first mesh station with reference to the maximum received signal strength indication and the path, the first mesh station may randomly select one gateway from the mesh gates as the mesh gate of the first mesh station. The present invention sets no specific limitation thereto.

Optionally, that the first mesh station selects the first mesh gate as the mesh gate of the first mesh station may be understood as follows: The first mesh station configures an address of the mesh gate of the first mesh station as an identifier of the first mesh gate (in actual application, generally, an identifier of a mesh gate is a MAC address of the mesh gate).

In this embodiment of the present invention, each mesh station in a wireless mesh network can select a mesh gate as a mesh gate of the mesh station, where an overhead between the mesh gate and the mesh station is the minimum overhead. Because each mesh station can dynamically select a mesh gate as a mesh gate of the mesh station, where an overhead between the mesh gate and the mesh station is the minimum overhead, all the mesh stations may select different mesh gates, so that balance among multiple mesh gates can be achieved, and congestion at the mesh gate can be prevented.

Further, each mesh station selects, according to indication information in a management frame sent by a neighboring station of the mesh station, a mesh gate as a mesh gate of the mesh station, where an overhead between the mesh gate and the mesh station is the minimum overhead. Therefore, a path that is from each mesh station to a mesh gate selected by the mesh station and that passes through mesh stations (including the neighboring station that sends the management frame, and stations in a shortest path between the neighboring station and the mesh gate) is also the shortest one of all paths between the mesh station and the mesh gate selected by the mesh station.

For example, as shown in FIG. 2, because the station 3 selects the gateway 1 as a gateway of the station 3, a path that is from the station 3 to the gateway 1 and that passes through the station 1 is also the shortest one of all paths between the station 3 and the gateway 1. All the paths between the station 3 and the gateway 1 include: the station 3—the station 1—the gateway 1; the station 3—the station 1—the station 2—the gateway 1; the station 3—the station 2—the gateway 1; the station 3—the station 2—the station 1—the gateway 1; the station 3—the station 4—the station 2—the gateway 1; and the station 3—the station 4—the station 2—the station 1—the gateway 1.

In the method for transmitting data in a wireless mesh network provided in this embodiment of the present invention, each mesh station in a wireless mesh network can select, from multiple mesh gates in the wireless mesh network, a mesh gate as a mesh gate of the mesh station, where an overhead between the mesh gate and the mesh station is the minimum overhead. Therefore, in the wireless mesh network, mesh stations that select a same mesh gate can form a subnet, so that the wireless mesh network is logically divided into multiple subnets.

It may be understood that in this embodiment of the present invention, a mesh station may receive a management frame sent by each neighboring station of the mesh station, and the mesh station may also send a management frame to each neighboring station of the mesh station. The neighboring stations of the mesh station include all stations that have a mesh peering with the mesh station.

Figure 6:
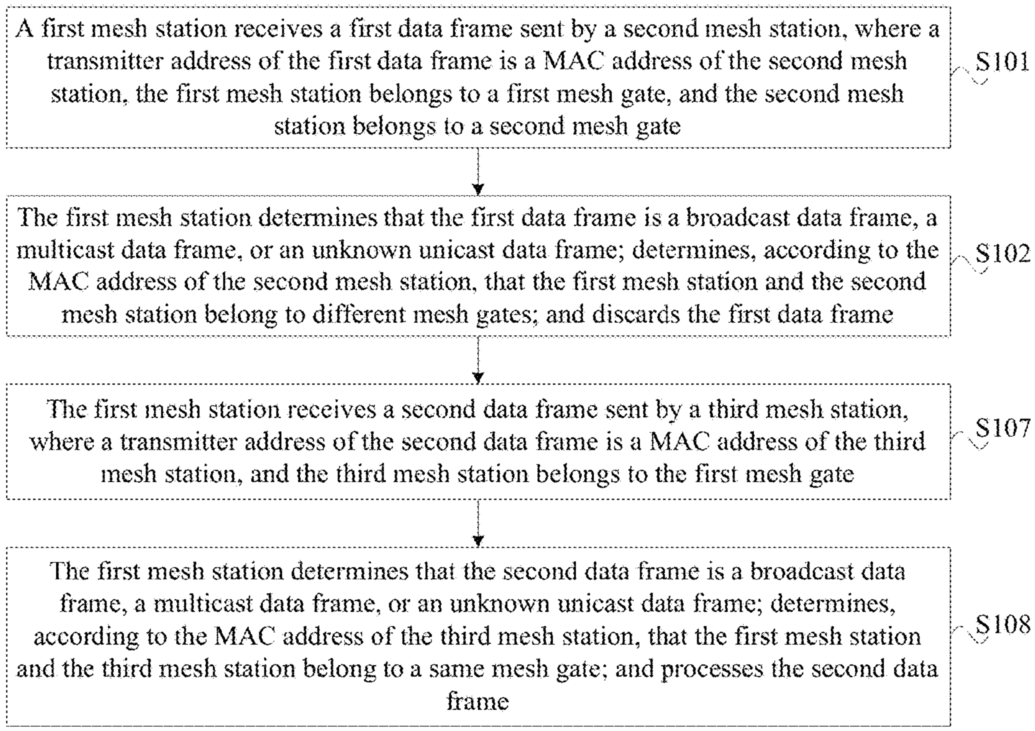
FIG. 6 is a flowchart 4 of a method for transmitting data in a wireless mesh network according to an embodiment of the present invention.

Optionally, with reference to FIG. 3, as shown in FIG. 6, the method for transmitting data in a wireless mesh network provided in this embodiment of the present invention may further include the following steps.

S107. The first mesh station receives a second data frame sent by a third mesh station, where a transmitter address of the second data frame is a MAC address of the third mesh station, and the third mesh station belongs to the first mesh gate.

The first mesh station and the third mesh station are two mesh stations in the wireless mesh network. The first mesh station and the third mesh station are neighboring stations that have a mesh peering with each other. The third mesh station may be an AP. For descriptions of the mesh peering, specifically refer to the related descriptions of the mesh peering in S101 in the foregoing embodiment. Details are not described herein again.

In this embodiment of the present invention, because the first mesh station and the third mesh station belong to a same mesh gate, it may be considered that the first mesh station and the third mesh station belong to a same subnet.

For example, as shown in FIG. 2, assuming that the first mesh station is the station 3, the third mesh station may be the station 1. Because the station 3 and the station 1 belong to a same mesh gate, that is, the gateway 1, it may be considered that the station 3, the station 1, and the gateway 1 belong to a same subnet, such as the subnet 1.

A frame header of the second data frame in this embodiment of the present invention includes a destination address of the second data frame.

For descriptions of the transmitter address of the second data frame, specifically refer to the related descriptions of the transmitter address of the first data frame in S101 in the foregoing embodiment. Details are not described herein again.

S108. The first mesh station determines that the second data frame is a broadcast data frame, a multicast data frame, or an unknown unicast data frame; determines, according to the MAC address of the third mesh station, that the first mesh station and the third mesh station belong to a same mesh gate; and processes the second data frame.

For descriptions of the broadcast data frame, the multicast data frame, and the unknown unicast data frame, specifically refer to the related descriptions of the broadcast data frame, the multicast data frame, and the unknown unicast data frame in S101 in the foregoing embodiment. Details are not described herein again.

In this embodiment of the present invention, the processing, by the first mesh station, the second data frame includes: forwarding, by the first mesh station, the second data frame.

In this embodiment of the present invention, when determining, according to the destination address of the second data frame that is sent by the third mesh station and received by the first mesh station, that the second data frame is a broadcast data frame, a multicast data frame, or an unknown unicast data frame, and determining, according to the MAC address of the third mesh station, that the first mesh station and the third mesh station belong to a same mesh gate, the first mesh station processes the second data frame.

In the method provided in this embodiment of the present invention, a first mesh station discards a broadcast data frame, a multicast data frame, or an unknown unicast data frame sent by a second mesh station (the second mesh station and the first mesh station belong to different mesh gates), and the first mesh station processes a broadcast data frame, a multicast data frame, or an unknown unicast data frame sent by a third mesh station (the third mesh station and the first mesh station belong to a same mesh gate). Therefore, the broadcast data frame, the multicast data frame, or the unknown unicast data frame in this embodiment of the present invention is not propagated between different subnets (all mesh stations in one subnet belong to a same mesh gate), but is propagated only in a same subnet. Therefore, a loop in a network including a wireless mesh network and an external network can be avoided.

In this embodiment of the present invention, for descriptions of the subnet, specifically refer to the related descriptions of the subnet in S101 in the foregoing embodiment. Details are not described herein again.

In this embodiment of the present invention, an execution order of S101 and S102, and S107 and S108 is not limited. That is, in this embodiment of the present invention, S101 and S102 may be performed before S107 and S108, or S107 and S108 may be performed before S101 and S102, or S101 and S102, and S107 and S108 may be performed simultaneously.

Figure 7:
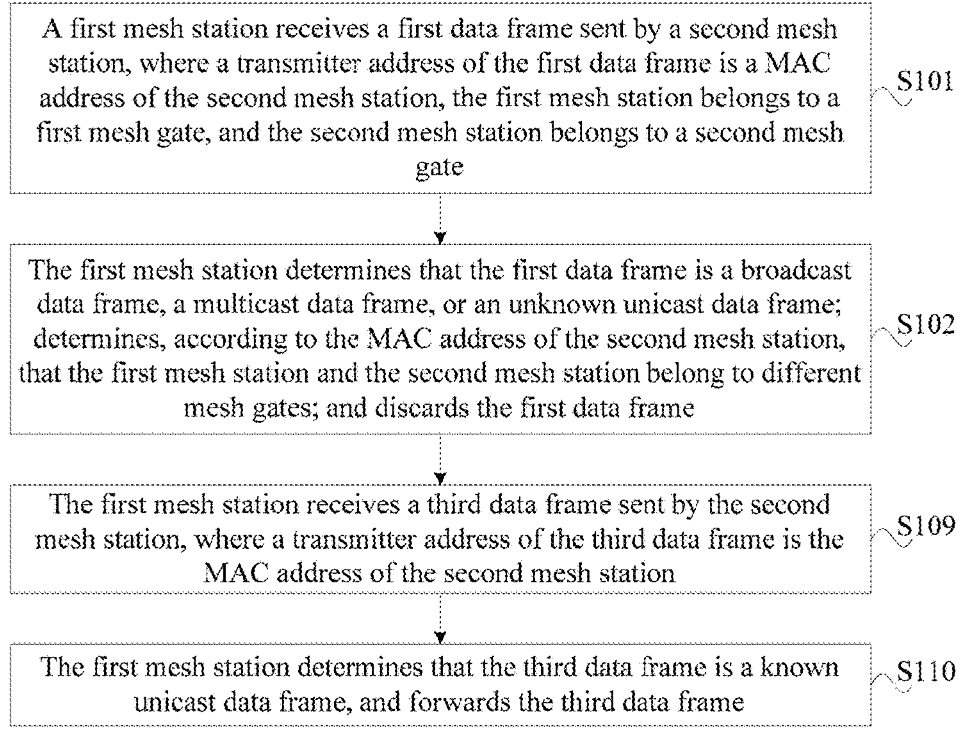
FIG. 7 is a flowchart 5 of a method for transmitting data in a wireless mesh network according to an embodiment of the present invention.

Optionally, with reference to FIG. 3, as shown in FIG. 7, the method for transmitting data in a wireless mesh network provided in this embodiment of the present invention may further include the following steps.

S109. The first mesh station receives a third data frame sent by the second mesh station, where a transmitter address of the third data frame is the MAC address of the second mesh station.

S110. The first mesh station determines that the third data frame is a known unicast data frame, and forwards the third data frame.

In this embodiment of the present invention, when determining that the third data frame sent by the second mesh station is a known unicast data frame, the first mesh station needs to forward the third data frame. That is, in the method for transmitting data in a wireless mesh network provided in this embodiment of the present invention, a known unicast data frame is still transmitted according to a conventional technology, and transmission of the known unicast data frame is not affected.

A known unicast data frame means that a destination address of the data frame is a unicast address, and the unicast address exists in the MAC forwarding table of the first mesh station.

In this embodiment of the present invention, an execution order of S101 and S102, and S109 and S110 is not limited. That is, in this embodiment of the present invention, S101 and S102 may be performed before S109 and S110, or S109 and S110 may be performed before S101 and S102, or S101 and S102, and S109 and S110 may be performed simultaneously.

Figure 8:
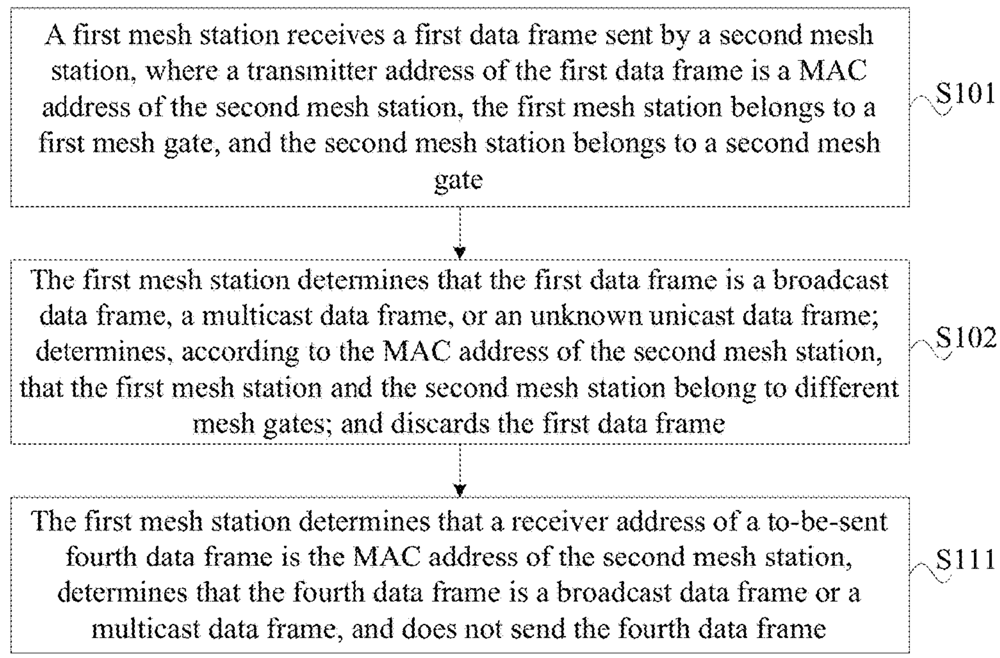
FIG. 8 is a flowchart 6 of a method for transmitting data in a wireless mesh network according to an embodiment of the present invention.

Optionally, with reference to FIG. 3, as shown in FIG. 8, the method for transmitting data in a wireless mesh network provided in this embodiment of the present invention may further include the following step.

S111. The first mesh station determines that a receiver address of a to-be-sent fourth data frame is the MAC address of the second mesh station, determines that the fourth data frame is a broadcast data frame or a multicast data frame, and skips sending the fourth data frame.

In the method for transmitting data in a wireless mesh network provided in this embodiment of the present invention, when determining that a receiver address of a to-be-sent broadcast data frame or multicast data frame is a MAC address of a second mesh station that belongs to a mesh gate different from that to which a first mesh station belongs, the first mesh station may not send the broadcast data frame or the multicast data frame to the second mesh station. In this way, the first mesh station sends, to a third mesh station that belongs to a same mesh gate as the first mesh station, a to-be-sent broadcast data frame or multicast data frame only when a receiver address of the broadcast data frame or the multicast data frame is a MAC address of the third mesh station. In this way, a transmitter can control a broadcast data frame or a multicast data frame to be propagated only in a same subnet, but not between different subnets. This optional solution can reduce air interface resources used for data frame transmission.

If the fourth data frame is sent in a form of an A-MSDU subframe, the receiver address of the fourth data frame refers to a receiver address in a MAC header of an A-MSDU frame including the A-MSDU subframe. The skipping sending the fourth data frame means removing the A-MSDU subframe from the A-MSDU frame.

In this embodiment of the present invention, an execution order of S101 and S102, and S111 is not limited. That is, in this embodiment of the present invention, S101 and S102 may be performed before S111, or S111 may be performed before S101 and S102, or S101 and S102, and S111 may be performed simultaneously.

Optionally, because a management frame needs to be propagated in the entire wireless mesh network, after receiving a management frame, each mesh station in the wireless mesh network processes the management frame received by the mesh station. For example, each mesh station in the wireless mesh network responds to the management frame received by the mesh station.

Optionally, because management frames may be continuously transmitted between mesh stations, each mesh station may determine an overhead between the mesh station and each mesh gate in real time according to indication information included in management frames received by the mesh station, and select a mesh gate as a mesh gate of the mesh station, where an overhead between the mesh gate and the mesh station is the minimum overhead. In this method, each mesh station can dynamically select a mesh gate as a mesh gate of the mesh station, where an overhead between the mesh gate and the mesh station is the minimum overhead, so as to better achieve balance among mesh gates and prevent congestion at the mesh gate.

Further, when a mesh gate is faulty or a location of a mesh gate/mesh station changes, in the foregoing method of selecting, by a mesh station, a mesh gate in real time, each mesh station can select, in real time, a mesh gate as a mesh gate of the mesh station, where an overhead between the mesh gate and the mesh station is the minimum overhead. For example, a mesh station can switch from an originally selected mesh gate to a newly selected mesh gate in real time, so that it is ensured that a service transmitted by each mesh station is not interrupted.

The accompanying drawings in the foregoing embodiment are merely for illustrative descriptions of the method for transmitting data in a wireless mesh network in this embodiment of the present invention, and are not intended to limit this embodiment of the present invention. That is, this embodiment of the present invention includes but is not limited to the accompanying drawings in the foregoing embodiment. Any other accompanying drawings that can be obtained from the technical solutions/accompanying drawings of this embodiment of the present invention shall fall within the protection scope of this embodiment of the present invention.

In the method for transmitting data in a wireless mesh network provided in this embodiment of the present invention, on the one hand, because a management frame can be transmitted in an entire wireless mesh network, it can be ensured that all mesh stations in the entire wireless mesh network can receive the management frame. On the other hand, because a broadcast data frame, a multicast data frame, or an unknown unicast data frame is propagated only in a same subnet, but not between different subnets, a case in which all the mesh stations in the entire wireless mesh network can receive the broadcast data frame, the multicast data frame, or the unknown unicast data frame can be avoided, that is, a data storm can be avoided. Therefore, a loop in a network including the wireless mesh network and an external network can be avoided.

In the method for transmitting data in a wireless mesh network provided in this embodiment of the present invention, on the one hand, when a first data frame that is received by a first mesh station and sent by a second mesh station that belongs to a mesh gate different from that to which the first mesh station belongs is a broadcast data frame, a multicast data frame, or an unknown unicast data frame, the first mesh station discards the first data frame, that is, the first mesh station does not process the first data frame, so that the first data frame is not propagated between different mesh gates. Therefore, a loop in a network including a wireless mesh network and an external network can be avoided. On the other hand, because there is still a first mesh gate and a second mesh gate, and a quantity of mesh gates in the wireless mesh network is not reduced, congestion at the mesh gate can be prevented. Therefore, in this embodiment of the present invention, congestion at the mesh gate can be prevented while a loop is avoided.

Embodiment 2

Figure 9:
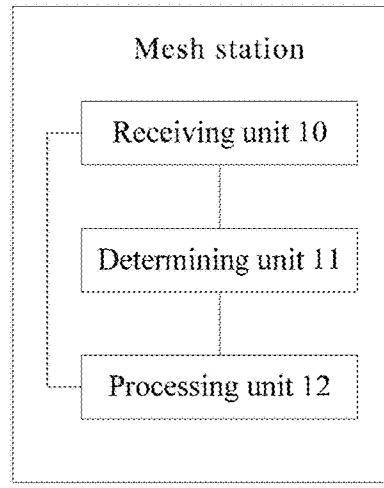
FIG. 9 is a schematic structural diagram 1 of a mesh station according to an embodiment of the present invention.

As shown in FIG. 9, this embodiment of the present invention provides a station. The station is a mesh station supporting a mesh function, the mesh station is a first mesh station, and the first mesh station includes:

a receiving unit 10, configured to receive a first data frame sent by a second mesh station, where a transmitter address of the first data frame is a MAC address of the second mesh station, the first mesh station belongs to a first mesh gate, and the second mesh station belongs to a second mesh gate; a determining unit 11, configured to: determine that the first data frame received by the receiving unit 10 is a broadcast data frame, a multicast data frame, or an unknown unicast data frame; and determine, according to the MAC address of the second mesh station that is received by the receiving unit 10, that the first mesh station and the second mesh station belong to different mesh gates; and a processing unit 12, configured to discard, according to the result determined by the determining unit 11, the first data frame received by the receiving unit 10.

Figure 10:
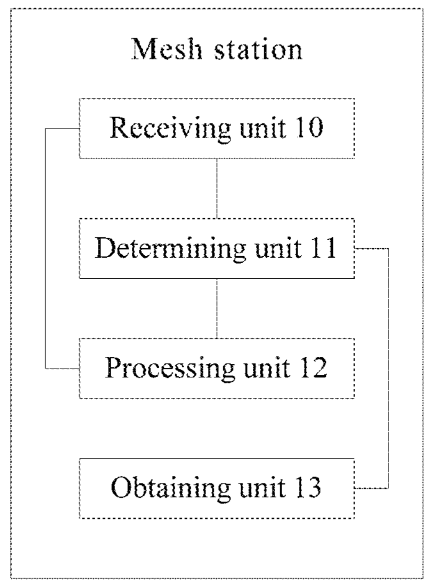
FIG. 10 is a schematic structural diagram 2 of a mesh station according to an embodiment of the present invention.

Optionally, with reference to FIG. 9, as shown in FIG. 10, the first mesh station may further include an obtaining unit 13.

The receiving unit 10 is further configured to: before receiving the first data frame sent by the second mesh station, receive a management frame sent by the second mesh station. A transmitter address of the management frame is the MAC address of the second mesh station, and the management frame includes an identifier of the second mesh gate. The obtaining unit 13 is configured to obtain a correspondence between the second mesh station and the second mesh gate. The determining unit 11 is specifically configured to determine, according to the MAC address of the second mesh station that is received by the receiving unit 10 and the correspondence between the second mesh station and the second mesh gate that is obtained by the obtaining unit 13, that the first mesh station and the second mesh station belong to different mesh gates.

Figure 11:
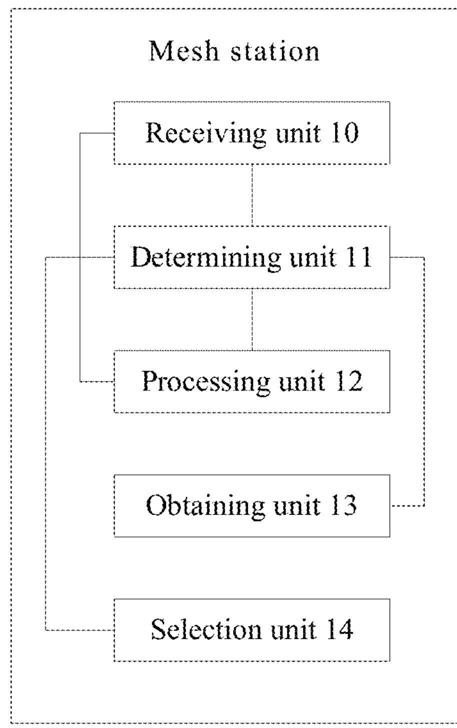
FIG. 11 is a schematic structural diagram 3 of a mesh station according to an embodiment of the present invention.

Optionally, with reference to FIG. 10, as shown in FIG. 11, the first mesh station further includes a selection unit 14.

The determining unit 11 is further configured to: before the receiving unit 10 receives the first data frame sent by the second mesh station, determine a minimum overhead between the first mesh station and each of multiple mesh gates. The multiple mesh gates include the first mesh gate and the second mesh gate. The selection unit 14 is configured to select, according to the minimum overhead that is between the first mesh station and each of the multiple mesh gates and that is determined by the determining unit 11, the first mesh gate as a mesh gate to which the first mesh station belongs. Among the multiple mesh gates an overhead between the first mesh gate and the first mesh station is the minimum overhead.

Optionally, the receiving unit 10 is further configured to receive a second data frame sent by a third mesh station. A transmitter address of the second data frame is a MAC address of the third mesh station, and the third mesh station belongs to the first mesh gate. The determining unit 11 is further configured to: determine that the second data frame received by the receiving unit 10 is a broadcast data frame, a multicast data frame, or an unknown unicast data frame; and determine, according to the MAC address of the third mesh station that is received by the receiving unit 10, that the first mesh station and the third mesh station belong to a same mesh gate. The processing unit 12 is further configured to process, according to the result determined by the determining unit 11, the second data frame received by the receiving unit 10.

Optionally, the receiving unit 10 is further configured to receive a third data frame sent by the second mesh station. A transmitter address of the third data frame is the MAC address of the second mesh station. The determining unit 11 is further configured to determine that the third data frame received by the receiving unit 10 is a known unicast data frame. The processing unit 12 is further configured to forward the third data frame according to the result determined by the determining unit 11.

Optionally, the determining unit 11 is further configured to: determine that a receiver address of a to-be-sent fourth data frame is the MAC address of the second mesh station, and determine that the fourth data frame is a broadcast data frame or a multicast data frame. The processing unit 12 is further configured to skip sending the fourth data frame according to the result determined by the determining unit 11.

In this embodiment of the present invention, the stations, that is, the first mesh station, the second mesh station, and the third mesh station all are mesh stations in a wireless mesh network. Both the first mesh gate and the second mesh gate are mesh gates in the wireless mesh network. The first mesh station, the second mesh station, the third mesh station, the first mesh gate, and the second mesh gate may all be APs.

The first mesh station and the second mesh station are neighboring stations that have a mesh peering. The first mesh station and the third mesh station are also neighboring stations that have a mesh peering. For descriptions of the mesh peering, specifically refer to the related descriptions of the mesh peering in S101 in Embodiment 1. Details are not described herein again.

For related descriptions of the broadcast data frame, the multicast data frame, the unknown unicast data frame, the known unicast data frame, other terms involved when units of the mesh station implement the foregoing processes, and explanatory descriptions of the terms, specifically refer to the related descriptions in the steps of the method embodiment shown in Embodiment 1. Details are not described herein again.

"Multiple" in this embodiment of the present invention refers to two or more. For example, multiple mesh gates refer to two or more mesh gates.

This embodiment of the present invention provides a station. The station is a mesh station supporting a mesh function, and the mesh station is a first mesh station. On the one hand, when a first data frame that is received by the first mesh station and sent by a second mesh station that belongs to a mesh gate different from that to which the first mesh station belongs is a broadcast data frame, a multicast data frame, or an unknown unicast data frame, the first mesh station discards the first data frame, that is, the first mesh station does not process the first data frame, so that the first data frame is not propagated between different mesh gates. Therefore, a loop in a network including a wireless mesh network and an external network can be avoided. On the other hand, in this embodiment of the present invention, because there is still a first mesh gate and a second mesh gate, and a quantity of mesh gates in the wireless mesh network is not reduced, congestion at the mesh gate can be prevented. Therefore, in this embodiment of the present invention, congestion at the mesh gate can be prevented while a loop is avoided.

Embodiment 3

This embodiment of the present invention provides a station. The station is a mesh station supporting a mesh function, and the mesh station is a first mesh station. The first mesh station includes a processor, a transceiver, and a memory. The processor, the transceiver, and the memory may be connected and communicate with each other by using a system bus.

Figure 12:
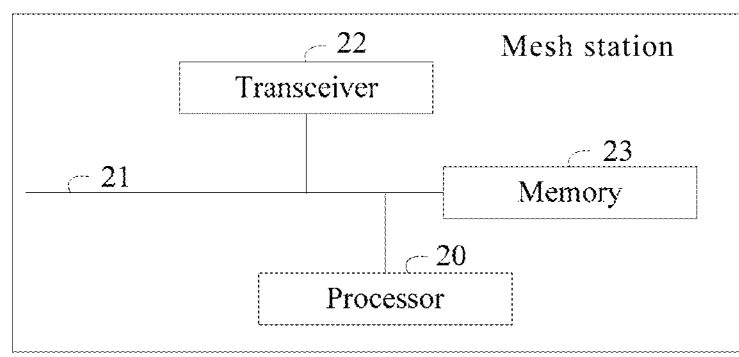
FIG. 12 is a schematic hardware diagram of a mesh station according to an embodiment of the present invention.

As shown in FIG. 12, FIG. 12 is a schematic hardware diagram of the station (that is, the first station) according to this embodiment of the present invention. In FIG. 12, the processor 20, the transceiver 22, and the memory 23 are connected and communicate with each other by using the system bus 21.

The processor 20 may be a central processing unit (CPU).

The memory 23 is configured to: store program code and transmit the program code to the processor 20. The processor 20 executes the following instructions according to the program code. The memory 23 may include a volatile memory, such as a random-access memory (RAM). The memory 23 may include a nonvolatile memory, such as a read-only memory (ROM), a flash memory, a hard disk drive (HDD), or a solid-state drive (SSD). The memory 23 may include a combination of the foregoing types of memories. The processor 20, the memory 23, and the transceiver 22 are connected and communicate with each other by using the system bus 21.

The transceiver 22 may be a wireless transceiver. For example, the wireless transceiver may be a wireless network interface controller (WNIC). The wireless transceiver may be a signal processing chip with a wireless transceiver function. The wireless transceiver may be a unit/module that has a wireless transceiver function and that includes a signal processing chip without a wireless transceiver function, an antenna, an antenna feeder, and the like. The wireless transceiver may be another unit/module or the like that can implement a wireless transceiver function.

When the station is running, the processor 20 runs an execution instruction of the station, so as to execute the method procedure described in any one of FIG. 3 to FIG. 8. Details include the following.

The transceiver 22 is configured to receive a first data frame sent by a second mesh station. A transmitter address of the first data frame is a MAC address of the second mesh station. The first mesh station belongs to a first mesh gate, and the second mesh station belongs to a second mesh gate. The processor 20 is configured to: determine that the first data frame received by the transceiver 22 is a broadcast data frame, a multicast data frame, or an unknown unicast data frame; determine, according to the MAC address of the second mesh station that is received by the transceiver 22, that the first mesh station and the second mesh station belong to different mesh gates; and discard the first data frame received by the transceiver 22. The memory 23 is configured to store a software program that the processor 20 needs to execute to implement the foregoing processes, so that the processor 20 implements the foregoing processes by executing the software program stored in the memory 23.

Optionally, the transceiver 22 is further configured to: before receiving the first data frame sent by the second mesh station, receive a management frame sent by the second mesh station. A transmitter address of the management frame is the MAC address of the second mesh station, and the management frame includes an identifier of the second mesh gate. The processor 20 is further configured to: obtain a correspondence between the second mesh station and the second mesh gate; and determine, according to the MAC address of the second mesh station that is received by the transceiver 22 and the correspondence between the second mesh station and the second mesh gate, that the first mesh station and the second mesh station belong to different mesh gates.

Optionally, the processor 20 is further configured to: before the transceiver 22 receives the first data frame sent by the second mesh station, determine a minimum overhead between the first mesh station and each of multiple mesh gates; and select, according to the minimum overhead between the first mesh station and each of the multiple mesh gates, the first mesh gate as a mesh gate to which the first mesh station belongs. The multiple mesh gates include the first mesh gate and the second mesh gate. Among the multiple mesh gates an overhead between the first mesh gate and the first mesh station is the minimum overhead.

Optionally, the transceiver 22 is further configured to receive a second data frame sent by a third mesh station. A transmitter address of the second data frame is a MAC address of the third mesh station, and the third mesh station belongs to the first mesh gate. The processor 20 is further configured to: determine that the second data frame received by the transceiver 22 is a broadcast data frame, a multicast data frame, or an unknown unicast data frame; determine, according to the MAC address of the third mesh station that is received by the transceiver 22, that the first mesh station and the third mesh station belong to a same mesh gate; and process the second data frame received by the transceiver 22.

Optionally, the transceiver 22 is further configured to receive a third data frame sent by the second mesh station. A transmitter address of the third data frame is the MAC address of the second mesh station. The processor 20 is further configured to: determine that the third data frame received by the transceiver 22 is a known unicast data frame, and forward the third data frame received by the transceiver 22.

Optionally, the processor 20 is further configured to: determine that a receiver address of a to-be-sent fourth data frame is the MAC address of the second mesh station, determine that the fourth data frame is a broadcast data frame or a multicast data frame, and skip sending the fourth data frame.

In this embodiment of the present invention, the stations, that is, the first mesh station, the second mesh station, and the third mesh station all are mesh stations in a wireless mesh network. Both the first mesh gate and the second mesh gate are mesh gates in the wireless mesh network. The first mesh station, the second mesh station, the third mesh station, the first mesh gate, and the second mesh gate may all be APs.

The first mesh station and the second mesh station are neighboring stations that have a mesh peering. The first mesh station and the third mesh station are also neighboring stations that have a mesh peering. For descriptions of the mesh peering, specifically refer to the related descriptions of the mesh peering in S101 in Embodiment 1. Details are not described herein again.

For related descriptions of the broadcast data frame, the multicast data frame, the unknown unicast data frame, the known unicast data frame, other terms involved when units of the mesh station implement the foregoing processes, and explanatory descriptions of the terms, specifically refer to the related descriptions in the steps of the method embodiment shown in Embodiment 1. Details are not described herein again.

"Multiple" in this embodiment of the present invention refers to two or more. For example, multiple mesh gates refer to two or more mesh gates.

This embodiment of the present invention provides a station. The station is a mesh station supporting a mesh function, and the mesh station is a first mesh station. On the one hand, when a first data frame that is received by the first mesh station and sent by a second mesh station that belongs to a mesh gate different from that to which the first mesh station belongs is a broadcast data frame, a multicast data frame, or an unknown unicast data frame, the first mesh station discards the first data frame, that is, the first mesh station does not process the first data frame, so that the first data frame is not propagated between different mesh gates. Therefore, a loop in a network including a wireless mesh network and an external network can be avoided. On the other hand, in this embodiment of the present invention, because there is still a first mesh gate and a second mesh gate, and a quantity of mesh gates in the wireless mesh network is not reduced, congestion at the mesh gate can be prevented. Therefore, in this embodiment of the present invention, congestion at the mesh gate can be prevented while a loop is avoided.

Embodiment 4

This embodiment of the present invention provides a WLAN mesh network (referred to as a wireless mesh network) system. The wireless mesh network system includes a first mesh station, a second mesh station, and multiple mesh gates. The first mesh station may be the first mesh station described in Embodiment 2 or Embodiment 3.

"Multiple" in this embodiment of the present invention refers to two or more. For example, multiple mesh gates refer to two or more mesh gates.

As shown in FIG. 2, FIG. 2 is a schematic architectural diagram of a possible wireless mesh network system according to an embodiment of the present invention. The wireless mesh network system includes two mesh gates and multiple mesh stations. The two mesh gates are a gateway 1 and a gateway 2 respectively. The multiple mesh stations are a station 1, a station 2, a station 3, and a station 4 respectively. A first mesh station may be any mesh station (for example, the station 1, the station 2, the station 3, or the station 4) in the multiple mesh stations.

In this embodiment of the present invention, the wireless mesh network system further includes a third mesh station. The first mesh station and the third mesh station belong to a first mesh gate, and a second mesh station belongs to a second mesh gate. That is, the first mesh station and the second mesh station belong to different mesh gates, and the first mesh station and the third mesh station belong to a same mesh gate. The first mesh station and the second mesh station are neighboring stations that have a mesh peering. The first mesh station and the third mesh station are also neighboring stations in a mesh peering. For descriptions of the mesh peering, specifically refer to the related descriptions of the mesh peering in S101 in Embodiment 1. Details are not described herein again.

In this embodiment of the present invention, for other descriptions of the first mesh station, interaction between the mesh stations in the wireless mesh network system, and the like, refer to the related descriptions in Embodiment 1, Embodiment 2, or Embodiment 3. Details are not described herein again.

Mesh stations (for example, the first mesh station, the second mesh station, and the third mesh station) and mesh gates (for example, the first mesh gate and the second mesh gate) in this embodiment of the present invention may all be APs.

In the wireless mesh network system provided in this embodiment of the present invention, a first mesh station discards a broadcast data frame, a multicast data frame, or an unknown unicast data frame sent by a second mesh station (the second mesh station and the first mesh station belong to different mesh gates), and the first mesh station processes a broadcast data frame, a multicast data frame, or an unknown unicast data frame sent by a third mesh station (the third mesh station and the first mesh station belong to a same mesh gate). Therefore, a broadcast data frame, a multicast data frame, or an unknown unicast data frame is not propagated between mesh stations that belong to different mesh gates. That is, the broadcast data frame, the multicast data frame, or the unknown unicast data frame is propagated only in a same subnet, but not between different subnets. Therefore, a loop in a network including a wireless mesh network and an external network can be avoided.

In the wireless mesh network system provided in this embodiment of the present invention, when determining that a data frame, for example, a third data frame, sent by the second mesh station is a known unicast data frame, the first mesh station needs to forward the third data frame. That is, in this embodiment of the present invention, a known unicast data frame is still transmitted according to a conventional technology, and transmission of the known unicast data frame is not affected.

In the wireless mesh network system provided in this embodiment of the present invention, because a management frame needs to be propagated in the entire wireless mesh network, after receiving a management frame, each mesh station in the wireless mesh network processes the management frame received by the mesh station. Therefore, it can be ensured that the management frame is propagated in the entire wireless mesh network.

This embodiment of the present invention provides a wireless mesh network system. The wireless mesh network system includes a first mesh station, a second mesh station, and multiple mesh gates. On the one hand, when a first data frame that is received by the first mesh station and sent by the second mesh station that belongs to a mesh gate different from that to which the first mesh station belongs is a broadcast data frame, a multicast data frame, or an unknown unicast data frame, the first mesh station discards the first data frame, that is, the first mesh station does not process the first data frame, so that the first data frame is not propagated between different mesh gates. Therefore, a loop in a network including a wireless mesh network and an external network can be avoided. On the other hand, in this embodiment of the present invention, because there is still a first mesh gate and a second mesh gate, and a quantity of mesh gates in the wireless mesh network is not reduced, congestion at the mesh gate can be prevented. Therefore, in this embodiment of the present invention, congestion at the mesh gate can be prevented while a loop is avoided.

It may be clearly understood by a person skilled in the art that, for the purpose of convenient and brief description, division of the foregoing function modules is used as an example for illustration. In actual application, the foregoing functions can be allocated to and implemented by different function modules according to a requirement, that is, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be indirect couplings or communication connections between some interfaces, apparatuses, or units.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The foregoing integrated unit may be implemented in a form of a software functional unit.

When the integrated unit is implemented in the form of a software functional unit and sold or used as an independent product, the integrated unit may be stored in a computer-readable storage medium. Based on such an understanding, the technical solutions or some of the technical solutions may be implemented in a form of a software product. The software product is stored in a storage medium, and includes instructions for instructing a computer device (which may be a personal computer, a server, or a network device) or a processor to perform all or some of the steps of the methods described in the embodiments of the present invention. The storage medium is a non-transitory medium, and includes various media capable of storing program code, such as a flash memory, a removable hard disk, a read-only memory, a random access memory, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting data in a wireless local area network mesh network, wherein the method comprises:

receiving, by a first mesh station, a first data frame sent by a second mesh station, wherein a transmitter address of the first data frame is a media access control (MAC) address of the second mesh station, wherein the first mesh station belongs to a first mesh gate, and wherein the second mesh station belongs to a second mesh gate; and determining, by the first mesh station, that the first data frame is a broadcast data frame, a multicast data frame, or an unknown unicast data frame;

determining, by the first mesh station according to the MAC address of the second mesh station, that the first mesh station and the second mesh station belong to different mesh gates; and in response to determining that the first data frame is a broadcast data frame, a multicast data frame, or an unknown unicast data frame and that the first mesh station and the second mesh station belong to different mesh gates, discarding, by the first mesh station, the first data frame.

2. The method according to claim 1, wherein the method further comprises:

receiving, by the first mesh station, a management frame sent by the second mesh station, wherein a transmitter address of the management frame is the MAC address of the second mesh station, and wherein the management frame comprises an identifier of the second mesh gate; and obtaining, by the first mesh station, a correspondence between the second mesh station and the second mesh gate; and wherein the determining, by the first mesh station according to the MAC address of the second mesh station, that the first mesh station and the second mesh station belong to different mesh gates comprises:

determining, by the first mesh station according to the MAC address of the second mesh station and the correspondence between the second mesh station and the second mesh gate, that the first mesh station and the second mesh station belong to different mesh gates.

3. The method according to claim 1, wherein the method further comprises:

determining, by the first mesh station, a minimum overhead between the first mesh station and each of multiple mesh gates, wherein the multiple mesh gates comprise the first mesh gate and the second mesh gate; and selecting, by the first mesh station, the first mesh gate as a mesh gate to which the first mesh station belongs, wherein among the multiple mesh gates an overhead between the first mesh gate and the first mesh station is the minimum overhead.

4. The method according to claim 1, wherein the method further comprises:

receiving, by the first mesh station, a second data frame sent by a third mesh station, wherein a transmitter address of the second data frame is a MAC address of the third mesh station, and wherein the third mesh station belongs to the first mesh gate; and determining, by the first mesh station, that the second data frame is a broadcast data frame, a multicast data frame, or an unknown unicast data frame;

determining, by the first mesh station according to the MAC address of the third mesh station, that the first mesh station and the third mesh station belong to a same mesh gate; and in response to determining that the second data frame is a broadcast data frame, a multicast data frame, or an unknown unicast data frame and that the first mesh station and the third mesh station belong to a same mesh gate, processing, by the first mesh station, the second data frame in response to the determinations.

5. The method according to claim 1, wherein the method further comprises:

receiving, by the first mesh station, a third data frame sent by the second mesh station, wherein a transmitter address of the third data frame is the MAC address of the second mesh station; and determining, by the first mesh station, that the third data frame is a known unicast data frame; and in response to determining that the third data frame is a known unicast data frame, forwarding, by the first mesh station, the third data frame.

6. The method according to claim 1, wherein the method further comprises:

determining, by the first mesh station, that a receiver address of a to-be-sent fourth data frame is the MAC address of the second mesh station;

determining, by the first mesh station, that the fourth data frame is a broadcast data frame or a multicast data frame; and in response to determining that the receiver address of the to-be-sent fourth data frame is the MAC address of the second mesh station and that the fourth data frame is a broadcast data frame or a multicast data frame, skipping, by the first mesh station, sending the fourth data frame.

7. A station, wherein the station is a mesh station supporting a mesh function, the mesh station is a first mesh station, and the first mesh station comprises:

a transceiver, the transceiver configured to receive a first data frame sent by a second mesh station, wherein a transmitter address of the first data frame is a media access control (MAC) address of the second mesh station, wherein the first mesh station belongs to a first mesh gate, and wherein the second mesh station belongs to a second mesh gate; and at least one processor, the at least one processor configured to:

determine that the first data frame is a broadcast data frame, a multicast data frame, or an unknown unicast data frame;

determine, according to the MAC address of the second mesh station, that the first mesh station and the second mesh station belong to different mesh gates; and in response to determining that the first data frame is a broadcast data frame, a multicast data frame, or an unknown unicast data frame and that the first mesh station and the second mesh station belong to different mesh gates, discard the first data frame in response to the determinations.

8. The station according to claim 7, wherein the transceiver is further configured to: receive a management frame sent by the second mesh station, wherein a transmitter address of the management frame is the MAC address of the second mesh station, and wherein the management frame comprises an identifier of the second mesh gate; and the at least one processor is further configured to:

obtain a correspondence between the second mesh station and the second mesh gate; and determine, according to the MAC address of the second mesh station that is received by the transceiver and the correspondence between the second mesh station and the second mesh gate, that the first mesh station and the second mesh station belong to different mesh gates.

9. The station according to claim 7, wherein the at least one processor is further configured to:

determine a minimum overhead between the first mesh station and each of multiple mesh gates; and select, according to the minimum overhead between the first mesh station and each of the multiple mesh gates, the first mesh gate as a mesh gate to which the first mesh station belongs, wherein the multiple mesh gates comprise the first mesh gate and the second mesh gate, and wherein among the multiple mesh gates an overhead between the first mesh gate and the first mesh station is the minimum overhead.

10. The station according to claim 7, wherein the transceiver is further configured to receive a second data frame sent by a third mesh station, wherein a transmitter address of the second data frame is a MAC address of the third mesh station, and wherein the third mesh station belongs to the first mesh gate; and the at least one processor is further configured to:

determine that the second data frame received by the transceiver is a broadcast data frame, a multicast data frame, or an unknown unicast data frame;

determine, according to the MAC address of the third mesh station that is received by the transceiver, that the first mesh station and the third mesh station belong to a same mesh gate; and in response to determining that the second data frame received by the transceiver is a broadcast data frame, a multicast data frame, or an unknown unicast data frame and that the first mesh station and the third mesh station belong to a same mesh gate, process the second data frame received by the transceiver.

11. The station according to claim 7, wherein the transceiver is further configured to receive a third data frame sent by the second mesh station, wherein a transmitter address of the third data frame is the MAC address of the second mesh station; and the at least one processor is further configured to:

determine that the third data frame received by the transceiver is a known unicast data frame; and in response to determining that the third data frame received by the transceiver is a known unicast data frame, forward the third data frame received by the transceiver.

12. The station according to claim 7, wherein the at least one processor is further configured to:

determine that a receiver address of a to-be-sent fourth data frame is the MAC address of the second mesh station;

determine that the fourth data frame is a broadcast data frame or a multicast data frame; and in response to determining that the receiver address of a to-be-sent fourth data frame is the MAC address of the second mesh station and that the fourth data frame is a broadcast data frame or a multicast data frame, skip sending the fourth data frame.

13. A wireless local area network mesh network system, wherein the system comprises:

a first mesh station, a second mesh station, and a plurality of mesh gates, wherein the first mesh station is configured to:

receive a first data frame sent by the second mesh station, wherein a transmitter address of the first data frame is a media access control (MAC) address of the second mesh station, wherein the first mesh station belongs to a first mesh gate, and wherein the second mesh station belongs to a second mesh gate; and discard the first data frame when the first mesh station determines that the first data frame is a broadcast data frame, a multicast data frame, or an unknown unicast data frame and determines, according to the MAC address of the second mesh station, that the first mesh station and the second mesh station belong to different mesh gates.

14. The system according to claim 13, wherein the first mesh station is further configured to:

receive a management frame sent by the second mesh station, wherein a transmitter address of the management frame is the MAC address of the second mesh station, and wherein the management frame comprises an identifier of the second mesh gate; and obtain a correspondence between the second mesh station and the second mesh gate; and wherein determining that the first mesh station and the second mesh station belong to different mesh gates comprises:

determining, according to the MAC address of the second mesh station and the correspondence between the second mesh station and the second mesh gate, that the first mesh station and the second mesh station belong to different mesh gates.

15. The system according to claim 13, wherein the first mesh station is further configured to:

determine a minimum overhead between the first mesh station and each of multiple mesh gates, wherein the multiple mesh gates comprise the first mesh gate and the second mesh gate; and select the first mesh gate as a mesh gate to which the first mesh station belongs, wherein among the multiple mesh gates an overhead between the first mesh gate and the first mesh station is the minimum overhead.

16. The system according to claim 13, wherein the first mesh station is further configured to:

receive a second data frame sent by a third mesh station, wherein a transmitter address of the second data frame is a MAC address of the third mesh station, and wherein the third mesh station belongs to the first mesh gate; and determine that the second data frame is a broadcast data frame, a multicast data frame, or an unknown unicast data frame;

determine, according to the MAC address of the third mesh station, that the first mesh station and the third mesh station belong to a same mesh gate; and in response to determining that the second data frame is a broadcast data frame, a multicast data frame, or an unknown unicast data frame and that the first mesh station and the third mesh station belong to a same mesh gate, process the second data frame in response to the determinations.

17. The system according to claim 13, wherein the first mesh station is further configured to:

receive a third data frame sent by the second mesh station, wherein a transmitter address of the third data frame is the MAC address of the second mesh station; and determine that the third data frame is a known unicast data frame; and in response to determining that the third data frame is a known unicast data frame, forward the third data frame.

18. The system according to claim 13, wherein the first mesh station is further configured to:

determine that a receiver address of a to-be-sent fourth data frame is the MAC address of the second mesh station;

determine that the fourth data frame is a broadcast data frame or a multicast data frame; and in response to determining that the receiver address of a to-be-sent fourth data frame is the MAC address of the second mesh station and that the fourth data frame is a broadcast data frame or a multicast data frame, skip sending the fourth data frame.

* * * * *